United States Patent
Graner et al.

(10) Patent No.: US 9,885,101 B2
(45) Date of Patent: Feb. 6, 2018

(54) METHOD FOR MANUFACTURING A SOLENOID VALVE

(71) Applicant: Robert Bosch GmbH, Stuttgart (DE)

(72) Inventors: Juergen Graner, Sersheim (DE); Martin Maier, Moeglingen (DE); Anselm Berg, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/202,687

(22) Filed: Jul. 6, 2016

(65) Prior Publication Data

US 2016/0312350 A1    Oct. 27, 2016

Related U.S. Application Data

(62) Division of application No. 13/850,690, filed on Mar. 26, 2013, now Pat. No. 9,429,245.

(30) Foreign Application Priority Data

Mar. 26, 2012 (DE) .................. 10 2012 204 753

(51) Int. Cl.
  *C23C 4/12* (2016.01)
  *C23C 4/123* (2016.01)
  *B05D 1/02* (2006.01)
  *F16K 31/04* (2006.01)
  *F02M 51/06* (2006.01)
  (Continued)

(52) U.S. Cl.
  CPC ............... *C23C 4/123* (2016.01); *B05B 7/14* (2013.01); *B05D 1/02* (2013.01); *F02M 51/0653* (2013.01); *F02M 63/0017* (2013.01); *F16K 31/04* (2013.01); *F16K 31/0665* (2013.01);
  (Continued)

(58) Field of Classification Search
  CPC ..... F16K 31/04; C23C 4/123; F02M 63/0017; F02M 2200/02; F02M 2200/9038
  See application file for complete search history.

(56) References Cited

U.S. PATENT DOCUMENTS 4,005,733 A    2/1977  Riddel
5,732,888 A    3/1998  Maier et al.
(Continued)

FOREIGN PATENT DOCUMENTS

DE    10 2006 017 449 A1    10/2007
EP    1854909              11/2007
(Continued)

*Primary Examiner* — Eric Keasel
(74) *Attorney, Agent, or Firm* — Norton Rose Fulbright US LLP; Gerard Messina

(57) ABSTRACT

A method is described for manufacturing a solenoid valve, in particular a fuel injector, the solenoid valve having a valve needle which is movably guided in the axial direction, a magnet core and an armature which is situated axially diametrically opposed to the magnet core, the armature being situated on the valve needle, the armature having a first base material and a first reinforcing element and the magnet core having a second base material and a second reinforcing element. The method has one method step. The first reinforcing element is applied to the first base material and/or the second reinforcing element is applied to the second base material during the method step with the aid of molten bath spraying or with the aid of cold gas spraying.

3 Claims, 2 Drawing Sheets

(51) Int. Cl.
  *F02M 63/00*  (2006.01)
  *B05B 7/14*  (2006.01)
  *F16K 31/06*  (2006.01)
(52) U.S. Cl.
  CPC . *F02M 2200/02* (2013.01); *F02M 2200/9038* (2013.01)

(56) References Cited

U.S. PATENT DOCUMENTS

| | | |
|---|---|---|
| 5,996,911 A | 12/1999 | Gesk et al. |
| 6,017,591 A * | 1/2000 | Popoola ................. B23H 9/008 219/69.17 |
| 6,018,591 A | 1/2000 | Hemi et al. |
| 7,278,594 B2 * | 10/2007 | Koyanagi .......... F02M 51/0657 239/585.1 |
| 8,991,783 B2 | 3/2015 | Abe et al. |
| 2009/0200405 A1* | 8/2009 | Yoshimaru ......... F02M 51/0685 239/585.1 |
| 2010/0154734 A1 | 6/2010 | Sebright et al. |
| 2011/0155103 A1* | 6/2011 | Abe ................... F02M 51/0653 123/467 |

FOREIGN PATENT DOCUMENTS

| | | |
|---|---|---|
| EP | 2052789 | 4/2009 |
| EP | 2325473 | 5/2011 |
| WO | 2004/033895 | 4/2004 |
| WO | 2008115773 | 9/2008 |

\* cited by examiner

METHOD FOR MANUFACTURING A SOLENOID VALVE

CROSS REFERENCE

The present application is a divisional application of U.S. patent application Ser. No. 13/850,690, filed on Mar. 13, 2013, which claims priority to and the benefit under 35 U.S.C. § 119 of German Patent Application No. DE 102012204753.0, filed on Mar. 26, 2012, both of which are expressly incorporated herein by reference in their entirety.

FIELD

The present invention relates to a method for manufacturing a solenoid valve.

BACKGROUND INFORMATION

In the case of electromagnetically operable solenoid actuators for operating solenoid valves, in particular injectors, the mating contact members (armature and internal pole) are conventionally coated with a hard chromium layer for increasing the resistance to impact and friction wear as well as for producing a magnetic residual air gap.

However, it is disadvantageous in this case that the application of a hard chromium layer is typically comparatively time-consuming and comparatively expensive, making it advantageous in particular to avoid such a hard chromium layer which is applied in particular by electroplating.

An object of the present invention is to provide a cost-effectively implementable surface reinforcement of the armature and magnet core.

SUMMARY

An example solenoid valve according to the present invention and an example method according to the present invention for manufacturing a solenoid valve may have the advantage over the related art in that a targeted reinforcement of certain surface areas of the armature and the magnet core is possible in a simple and cost-effective manner. In particular, it is advantageously possible according to the present invention to avoid a time-consuming and expensive process for the application of a chromium layer by electroplating.

According to the present invention, it is provided that cold gas spraying or cold spray deposition is used for implementing the reinforcing elements, i.e., the first reinforcing element and the second reinforcing element. The cold gas spraying or cold spray deposition is a coating method in which the coating material in powder form is applied to the carrier material (substrate) at a very high velocity. For this purpose, a process gas heated to a few hundred ° C. is accelerated by expansion in a Laval nozzle to a supersonic velocity, and the powder particles are subsequently injected into the gas jet. The injected spraying particles are accelerated to such a high velocity that in contrast to other thermal spray methods, even without prior fusing, they form a dense and firmly adhering layer on impact onto the substrate. The kinetic energy at the point in time of impact is not sufficient for a complete fusing of the particles.

According to an example embodiment of the present invention, it is provided that only those surface areas of the first base material (the armature), and/or the second base material (the magnet core) are provided with the first reinforcing element or the second reinforcing element, which are exposed to an increased load, in particular a load caused by frictional or impact wear. In this way, it is advantageously possible according to the present invention for the reinforcing elements to be applied in a targeted manner, and thus economically with respect to the material of the reinforcing elements.

Advantageous example embodiments and refinements of the present invention may be derived from the description herein and the drawings.

According to a preferred refinement, it is provided that a material having a melting point higher than 500° C., preferably a material having a melting point higher than 1000° C., particularly preferably a material having a melting point higher than 1300° C. is used as the material of the reinforcing element. (In particular in contrast to relatively low-melting metals such as tin or tin alloys, copper or copper alloys or the like), this makes it advantageously possible according to the present invention that comparatively highly stressable materials may be used, so that the reinforcing elements (if their dimensioning is predefined, in particular with respect to layer thickness) are provided with relatively high mechanical stability.

According to another preferred refinement, it is provided that the material of the first and/or second reinforcing element is a chromium material or a nickel-chromium alloy, in particular an INCONEL alloy or a stainless steel alloy. This advantageously makes it possible for a high mechanical stability to be combined with good workability.

According to another preferred refinement, it is provided that the first reinforcing element is situated in a surface area of the armature which is situated generally perpendicularly to the axial direction of the valve needle, facing away from the magnet core, and is in particular situated only in the radially internal portion of this surface area of the armature facing away from the magnet core. According to the present invention, this advantageously makes it possible that a protection against wear is established with the aid of the first reinforcing element in the area between the armature and a sleeve fixedly connected to the valve needle or between the armature and the valve needle.

According to another preferred refinement, it is provided that the first reinforcing element is situated in a surface area of the armature facing the magnet core, which is situated generally perpendicularly to the axial direction of the valve needle. According to the present invention, this advantageously makes it possible to establish a protection against wear with the aid of the first reinforcing element in the area between the armature and a sleeve fixedly connected to the valve needle or between the armature and the valve needle (in particular, radially internal) or to establish a protection against wear with the aid of the first reinforcing element in the area between the armature and the magnet core (in particular, radially external).

Furthermore, according to a preferred refinement, it is provided according to the present invention that the second reinforcing element is situated in a surface area of the magnet core facing the armature, which is situated generally perpendicularly to the axial direction of the valve needle. According to the present invention, this advantageously makes it possible that a protection against wear is established with the aid of the second reinforcing element in the area between the armature and the magnet core (in particular, radially external).

According to a preferred refinement of the present invention, it is furthermore also provided that the second reinforcing element is situated in a cylindrical surface area of the magnet core which is generally parallel to the axial direction of the valve needle. According to the present invention, this advantageously makes it possible that a protection against wear is established with the aid of the second reinforcing element in the area between the magnet core and the valve needle or an element fixedly connected to the valve needle.

Another object of the present invention is a solenoid valve which is manufactured according to a method according to the present invention. This makes it possible for the solenoid valve to be implemented in a particularly cost-effective way and nonetheless having a particularly good resistance to wear and particularly good service life stability.

According to a preferred refinement, it is provided that the first reinforcing element and/or the second reinforcing element has/have a material thickness of 20 μm to 200 μm, preferably of 50 μm to 100 μm.

Exemplary embodiments of the present invention are represented in the figures and are explained in greater detail in the description below.

DETAILED DESCRIPTION OF EXAMPLE EMBODIMENTS

Figure 1:
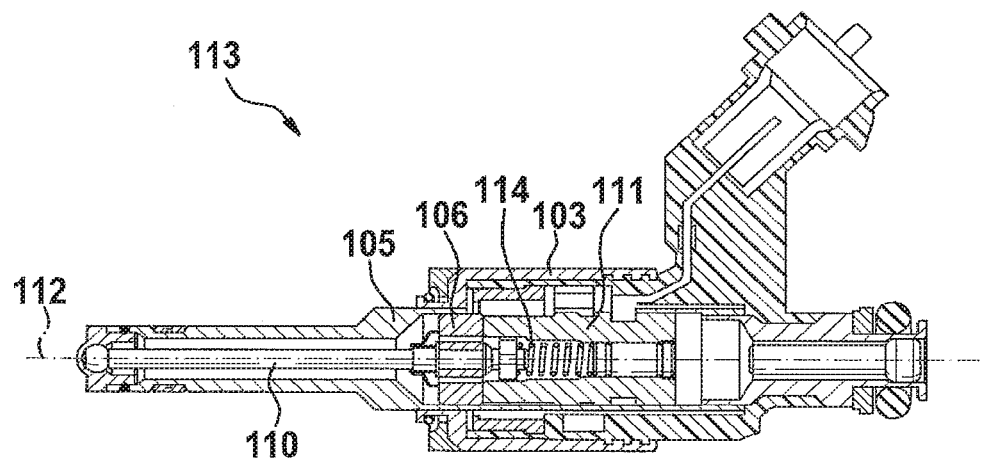
FIG. 1 shows a schematic sectional representation of an example solenoid valve according to the present invention.

Identical components are consistently provided with the same reference numerals in the various drawings and are therefore named or mentioned only once.

Figure 2:
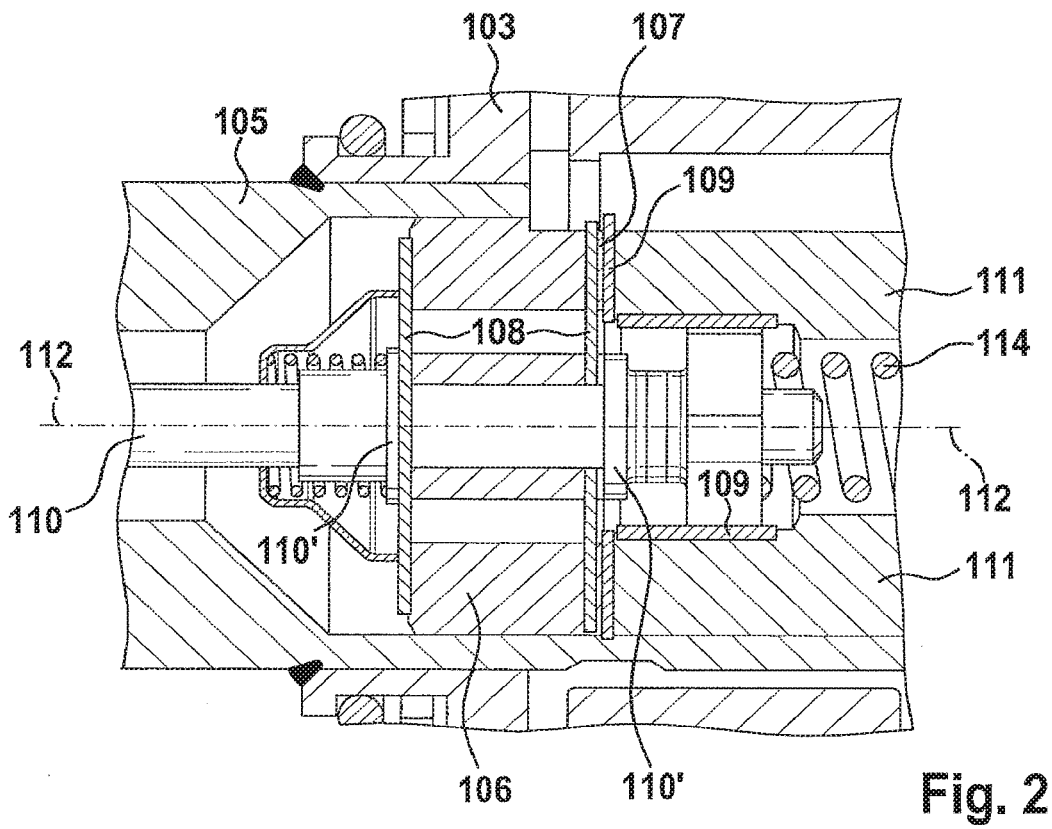
FIG. 2 shows a schematic detail of the sectional representation shown in FIG. 1.

FIG. 1 shows a schematic sectional representation of a solenoid valve 113 according to the present invention. FIG. 2 shows a schematic detail of the sectional representation shown in FIG. 1. Solenoid valve 113 is in particular an injector for liquid fuel, valve needle 110 and return spring 114 being recognizable. Solenoid valve 113 is generally designed to be rotationally symmetrical with respect to axis 112. A soft magnetic, i.e., manufactured from a ferromagnetic material, armature 106 (also referred to in the following as armature 106) is displaceably supported in the axial direction and, when coil 103 is switched on (also referred to in the following as solenoid coil 103), the armature is attracted by the resultant magnetic force of a soft magnetic internal pole 111 (also referred to in the following as magnet core 111). For a large magnetic force, it is desirable that the magnetic flux penetrates armature air gap 107 as completely as possible. For this purpose, a valve sleeve 105 (also referred to in the following as sleeve 105) is typically provided with an annular groove (referred to in the following as a groove or as a thin-wall area) in the area of armature air gap 107. Due to the small residual wall thickness (of sleeve 105), this thin wall area causes the cross section of valve sleeve 105 to be reduced, so that the magnetic flux passes almost completely in armature air gap 107 instead of passing unutilized in sleeve 105.

Valve sleeve 105 has the function of sealing the interior from the surroundings. The fuel pressure in the interior of sleeve 105 is generally significantly higher than the ambient pressure, so that sleeve 105 is pressurized and must withstand high radial forces.

For the reinforcement of the material (also referred to in the following as base material) of armature 106 and/or of magnet core 111—in particular in those areas (in particular surface areas) of armature 106 and/or magnet core 111, which are exposed to increased frictional or impact wear—it is provided according to the present invention that a first reinforcing element 108 is provided on armature 106, and/or that a second reinforcing element 109 is provided on magnet core 111. First reinforcing element 108 and/or second reinforcing element 109 is/are applied according to the present invention with the aid of molten bath spraying or with the aid of cold gas spraying. According to the present invention, a material having a melting point higher than 500° C., preferably a material having a melting point higher than 1000° C., particularly preferably a material having a melting point higher than 1300° C. is provided as the material of first reinforcing element 108 and/or second reinforcing element 109. First reinforcing element 108 and/or second reinforcing element 109 has/have in particular a greater resistance to wear than the base material of armature 106 and/or magnet core 111, making it possible to increase the longevity of the elements moving in relation to one another and optimized with respect to their magnetic properties, (i.e., armature 106 and/or magnet core 111) in an advantageous manner.

As shown in FIG. 2, valve needle 110 has an element 110' which is in particular fixedly connected (i.e., in particular form-locked and/or force-fit and/or integrally joined), and is thus not movable relative to the base material of valve needle 110. In contrast to this element 110' connected to valve needle 110, armature 106 is relatively displaceable (or relatively movable) parallel to the axial extent of valve needle 110 (i.e., parallel to axis 112), the relative movability of armature 106 being limited by two collars (denoted by reference numeral 110' and also referred to in the following as stop collars) of element 110' connected to valve needle 110. However, when solenoid valve 113 is operated, armature 106 strikes against the collars (due to its relative movement with respect to valve needle 110, and thus also with respect to element 110' which is connected to valve needle 110), as a result of which a protection against wear is provided in these surface areas of armature 106 in the form of first reinforcing element 108. Since the stop collar facing the injector has a relatively small radial extent, it is advantageous to provide first reinforcing element 108 in this surface area of the base material of armature 106 only in an inner radial area (or in a radially internal portion) and not on the entire surface area of armature 106 (facing away from magnet core 111) situated perpendicularly to axial direction 112 of the valve needle. On the side of armature 106 facing magnet core 111, it is, however, advantageously provided according to the present invention that first reinforcing element 108 extends across the entire radial extent of armature 106, since in addition to the stop area on magnet core 111 that faces stop collar 110' the area of air gap 107 should reasonably be protected as an additional point of a wear protection.

According to the present invention, second reinforcing element 109 is in particular provided on magnet core 111, in such a way that it covers the surface area of magnet core 111 which is opposite armature 106 (i.e., covers the base material of magnet core 111 in this area). This area is also situated generally perpendicularly to the axial direction of valve needle 110 (i.e., perpendicularly to axis 112). Furthermore, second reinforcing element 109 is situated according to the present invention in particular in that area of magnet core 111 opposite which valve needle 110 moves (or an element moving together with the valve needle). In this area, the surface area of magnet core 111 is provided in a cylindrical shape and parallel to the axial direction of valve needle 110.

Figure 3:
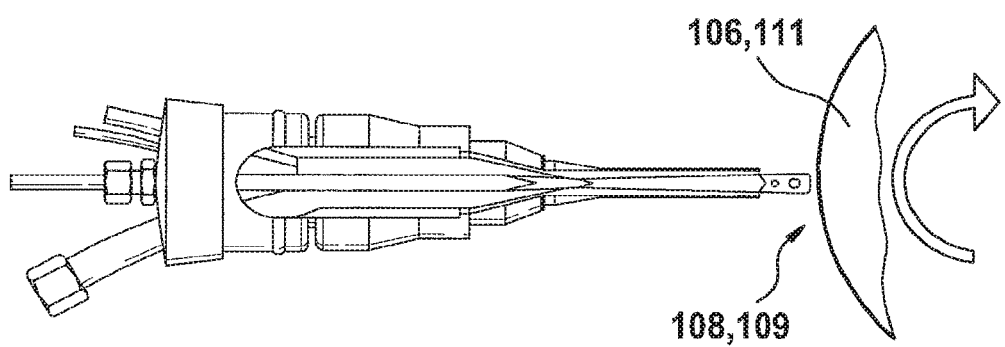
FIG. 3 shows a schematic representation of the application of a material for forming a reinforcing element on a surface of a base material with the aid of a molten bath spray method or with the aid of a cold gas spraying.

FIG. 3 shows a schematic representation of the application of a material for forming a reinforcing element on a surface of a base material with the aid of molten bath spraying or with the aid of cold gas spraying. In the case of the molten bath spray method, the material of first reinforcing element 108 and/or of second reinforcing element 109 to be applied is heated and applied to the surface to be coated i.e., the outer surface of the base material of armature 106 and/or magnet core 111. In the case of cold gas spraying, non-fused or unheated particles of the material to be applied are greatly accelerated and applied to the surface to be coated. In both cases, the result is a mechanically stable and in particular more wear-resistant layer of first reinforcing element 108 and/or second reinforcing element 109.

Cold gas spraying is also known by the name Flamecon from the Linde Corporation. Molten bath spraying is also known by the name MID (Molded Interconnect Devices).

According to the present invention, it is provided in the specific example embodiments that first reinforcing element 108 and/or second reinforcing element 109 is/are applied with the aid of molten bath spraying or with the aid of cold gas spraying.

What is claimed is:

1. A method for manufacturing a solenoid valve having a valve needle which is movably guided in an axial direction, a magnet core, an armature which is situated axially diametrically opposed to the magnet core, the armature being situated on the valve needle, the armature having a first base material and a first reinforcing element and the magnet core having a second base material and a second reinforcing element, the method comprising:
    applying i) the first reinforcing element to the first base material, and ii) the second reinforcing element to the second base material;
    wherein the applying is with the aid of one of molten bath spraying or cold gas spraying,
    wherein the armature includes two surfaces perpendicular to the axial direction: 1) a first surface facing the magnet core, and 2) a second surface facing away from the magnet core,
    wherein the first reinforcing element is applied to the first and second surfaces.

2. The method as recited in claim 1, wherein:
    the first reinforcing element is applied to an entire radial extent of the first surface, and
    the first reinforcing element is applied to less than an entire radial extent of the second surface.

3. The method as recited in claim 1, wherein the second reinforcing element is applied to a third surface, the third surface belonging to the magnet core and extending parallel to the axial direction.

* * * * *